G. F. KAUPP.
MUD CHAIN.
APPLICATION FILED MAY 24, 1918.
1,315,131. Patented Sept. 2, 1919.
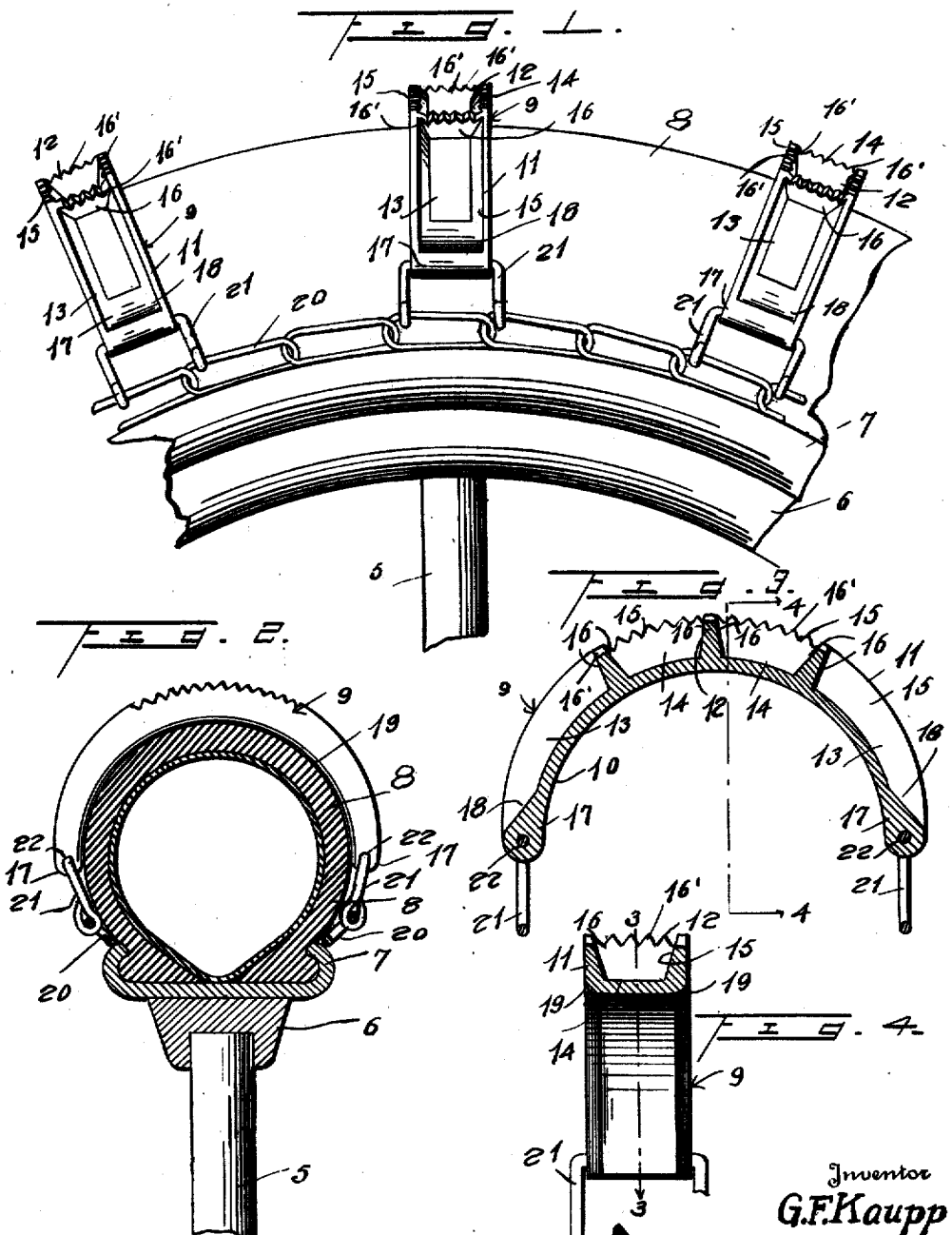
Inventor
G. F. Kaupp

UNITED STATES PATENT OFFICE.

GEORGE F. KAUPP, OF ABERDEEN, SOUTH DAKOTA.

MUD-CHAIN.

1,315,131. Specification of Letters Patent. Patented Sept. 2, 1919.

Application filed May 24, 1918. Serial No. 236,369.

*To all whom it may concern:*

Be it known that I, GEORGE F. KAUPP, a citizen of the United States, residing at Aberdeen, in the county of Brown and State of South Dakota, have invented certain new and useful Improvements in Mud-Chains; and I do hereby declare the following to be a full, clear, and exact description of the invention, such as will enable others skilled in the art to which it appertains to make and use the same.

My invention relates to anti skid devices for use upon automobile tires, which are either inflated or solid.

An important object of the invention is to provide a device of the above mentioned character, which is adapted to prevent rotary and lateral slipping or skidding of the tire or wheel upon which the same is applied.

A further object of the invention is to provide a device of the above mentioned character, which is so constructed that the same is self cleaning, to a high degree.

A further object of the invention is to provide a device of the above mentioned character, which is simple in construction, cheap to manufacture, and convenient in use.

Other objects and advantages of the invention will be apparent during the course of the following description.

In the accompanying drawings forming a part of this specification and in which like numerals are employed to designate like parts throughout the same, Figure 1 is a fragmentary side elevation of a device embodying my invention, showing the same in use.

Fig. 2 is a transverse section through a tire and associated elements, the device being shown applied.

Fig. 3 is a central longitudinal sectional view through the device, taken on line 3—3 of Fig. 4, and, Fig. 4 is a transverse sectional view taken on line 4—4 of Fig. 3.

In the drawings, wherein for the purpose of illustration is shown a preferred embodiment of my invention, the numeral 5 designates the spokes of a wheel, including a felly 6, having a rim 7 secured thereto, receiving and holding a pneumatic tire 8.

My improved anti skid device is designated as a whole by the numeral 9, and is preferably in the form of a casting, formed of a metal having the desired strength, stiffness, and lightness, such as steel or the like. The device or casting includes an inner longitudinally curved plate 10, having transversely spaced radial longitudinal flanges 11, projecting outwardly, as shown. In the tread portion of the device, the plate 10 is provided with transverse flanges 12, serving to connect the longitudinal flanges 11. The flanges 11 and 12 form with the plate 10 pockets or recesses 13 and 14, as shown. Particular attention is called to the fact that the flanges 11 and 12 are tapered in cross section, providing inclined walls 15 and 16, which diverge outwardly, whereby the pockets are tapered in longitudinal and transverse cross section, and increase in length and width outwardly. This is an important feature of the invention as these pockets become filled with mud or the like and their peculiar construction enables them to be self cleaning to a high degree.

As more clearly shown in Fig. 3, the plate 10 is provided at its opposite ends with enlargements or knuckles 17, having outer inclined walls 18.

As more clearly shown in Fig. 4, the longitudinal edges 19 of the plate 10, are rounded whereby the device will not injure the tire. The tread portion of my device is provided with teeth 16′ to insure the more perfect performance of the same.

Any suitable means may be employed for holding the device upon the tire. As an illustration of such means I provide chains 20, arranged on opposite sides of the tire and engaging links 21 extending through apertures 22 in the knuckles 17. The chains may have any suitable fastening means for their ends.

I may use one or more of my devices upon the tire 8. In applying the device to the tire, the plate 10 is placed transversely upon the tread portion thereof, and is suitably curved to conform to the curvature of the tire. The chains are now fastened securely at their ends to retain the device firmly on the tire. The longitudinal flanges 11 prevent rotary slipping or skidding of the tire or wheel, while the transverse flanges 12 prevent lateral slipping or skidding.

It is obvious that my anti skidding device may be made in different shapes and sizes, for receiving tires of different shapes and sizes.

It is to be understood that the form of my invention herewith shown and described is to be taken as a preferred example of the same and that various changes in the shape, size, and arrangement of parts, may be resorted to without departing from the spirit of my invention or the scope of the subjoined claim.

Having thus described my invention what I claim is:

An anti-skid device comprising a curved body plate adapted to be arranged transversely of a tire, a plurality of longitudinal outwardly projecting radial flanges carried by the body plate, a plurality of spaced transverse flanges carried by the plate and connecting the longitudinal flanges, teeth carried by the outer edges of said longitudinal and transverse flanges, and means to secure the body plate to the tire, the teeth of the longitudinal flanges terminating at points spaced considerably from the ends of the same to provide relatively smooth end portions for the body plate and longitudinal flanges.

In testimony whereof I affix my signature in presence of two witnesses.

GEORGE F. KAUPP.

Witnesses:
F. A. FELLOWS,
ROY POPEL.

Copies of this patent may be obtained for five cents each, by addressing the "Commissioner of Patents, Washington, D. C."